United States Patent
Fabusuyi et al.

(10) Patent No.: US 12,523,475 B2
(45) Date of Patent: Jan. 13, 2026

(54) ENERGY EFFICIENT SAMPLING FOR LAST-MILE DELIVERY SYSTEMS

(71) Applicant: THE REGENTS OF THE UNIVERSITY OF MICHIGAN, Ann Arbor, MI (US)

(72) Inventors: Tayo Fabusuyi, Ann Arbor, MI (US); Majid Mirzanezhad, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 251 days.

(21) Appl. No.: 18/510,077

(22) Filed: Nov. 15, 2023

(65) Prior Publication Data

US 2024/0167822 A1    May 23, 2024

Related U.S. Application Data

(60) Provisional application No. 63/425,712, filed on Nov. 16, 2022.

(51) Int. Cl.
| | | |
|---|---|---|
| *G01C 21/16* | (2006.01) | |
| *B60W 60/00* | (2020.01) | |
| *G01C 21/20* | (2006.01) | |

(52) U.S. Cl.
CPC ....... *G01C 21/1656* (2020.08); *B60W 60/001* (2020.02); *G01C 21/20* (2013.01)

(58) Field of Classification Search
CPC .............. G01C 21/1656; G01C 21/20; B60W 60/001
See application file for complete search history.

(56) References Cited

U.S. PATENT DOCUMENTS

| | | |
|---|---|---|
| 7,840,355 B2 | 11/2010 | Breed et al. |
| 9,103,671 B1 | 8/2015 | Breed et al. |
| 9,277,525 B2 | 3/2016 | Dupray et al. |
| 10,545,029 B2 | 1/2020 | Yang et al. |

(Continued)

OTHER PUBLICATIONS

Carola Alejandra Blazquez, et al. "An Instance-Specific Parameter Tuning Approach Using Fuzzy Logic for a Post-Processing Topological Map-Matching Algorithm." Sep. 11, 2018.

(Continued)

*Primary Examiner* — Brodie J Follman
(74) *Attorney, Agent, or Firm* — Harness, Dickey & Pierce, P.L.C.

(57) ABSTRACT

A computer-implemented method is presented for determining sampling rate for at least one of a camera and a receiver of a global navigation satellite system deployed in an autonomous vehicle. A Kalman filter is used for predicting a local sampling rate for the camera and a global sampling rate for the receiver in the global navigation satellite system. The method includes: retrieving length of the lane being traversed by the autonomous vehicle from a graph, where nodes of the graph represent intersection in a road network and edges of the graph represent paths in the road network; measuring speed of the autonomous vehicle as it traverses the lane; estimating the local sampling rate and the global sampling rate using the measured speed and the Kalman filter; and capturing, by the camera, images in accordance with the local sampling rate estimated by the Kalman filter.

12 Claims, 2 Drawing Sheets

(56) References Cited

U.S. PATENT DOCUMENTS 10,742,475 B2    8/2020  Lai et al.
11,804,131 B2 *  10/2023 Kumar et al. ...... B60W 60/001
2016/0139242 A1  5/2016  Dupray et al.

OTHER PUBLICATIONS

Chenjuan Guo et al. "Learning to Route with Sparse Trajectory Sets." Department of Computer Science, Aalborg University, Denmark. 2018 IEEE.
Marko Nikolic et al. "Implementation of generic algoritm in map-matching model." 2017.
Chenjuan Guo et al. "Learning to Route with Sparse Trajectory Sets—Extended Version." Feb. 22, 2018.
Jeffrey L. Duffany, Ph. D. "Artificial Intelligence in GPS Navigation Systems." 2010.
Zhichen Pan et al. "ClusterMap Building and Relocalization in Urban environments for Unmanned Vehicles." Sep. 30, 2019.
Rodrigo Augusto de Oliveira e Silva et al. "Personalized route recommendation through historical travel behavior analysis." Nov. 10, 2021.
Jiangang Shu et al. "Efficient Lane-Level Map Building via Vehicle-Based Crowdsourcing." May 2022.

* cited by examiner

ENERGY EFFICIENT SAMPLING FOR LAST-MILE DELIVERY SYSTEMS

CROSS-REFERENCE TO RELATED APPLICATIONS

This application claims the benefit of U.S. Provisional Application No. 63/425,712, filed on Nov. 16, 2023. The entire disclosure of the above application is incorporated herein by reference.

FIELD

The present disclosure relates to maintaining veracity of information obtained from noisy and sparse GPS data in context of vehicle navigation.

BACKGROUND

Over the past few decades, vehicle navigation systems using global positioning systems (GPS) have received substantial attention in transportation research and development. One of the key components of such systems is reliable geolocational data that is captured by the satellite in order to track the commuting entity on a road network. Such data is often noisy particularly when the entity is located in high density-built environments, such as cities' central business districts (CBDs), where tall and massive structures often restrict satellites from sending and/or receiving signals easily. This typically causes signal obstruction when the commuting entity is stuck in some blind spot, meaning the GPS may not successfully locate the entity. In some cases, tracking entities and vehicles using GPS is difficult due to energy considerations and privacy reasons. This leads to low-sampling data and its attendant complications. The result of infrequent and noisy GPS samples is scattered data with locations spread entirely across the road network, thus making it difficult to ascertain the actual path traversed by the entity. Clearly, the sparsity of the samples is defined with respect to a base underlying network from where the GPS samples are retrieved.

This section provides background information related to the present disclosure which is not necessarily prior art.

SUMMARY

This section provides a general summary of the disclosure, and is not a comprehensive disclosure of its full scope or all of its features.

A computer-implemented method is presented for determining sampling rate for at least one of a camera and a receiver of a global navigation satellite system deployed in an autonomous vehicle. A Kalman filter is used for predicting a local sampling rate for the camera and a global sampling rate for the receiver in the global navigation satellite system, where control matrix of the Kalman filter is defined in terms of length of a lane being traversed by the autonomous vehicle, state transition matrix of the Kalman filter is defined in terms the number of entities occupying a unit length of the lane, and measurable input to the Kalman filter is speed of the autonomous vehicle. The method includes: retrieving length of the lane being traversed by the autonomous vehicle from a graph, where nodes of the graph represent intersection in a road network and edges of the graph represent paths in the road network; measuring speed of the autonomous vehicle as it traverses the lane; estimating the local sampling rate and the global sampling rate using the measured speed and the Kalman filter; and capturing, by the camera, images in accordance with the local sampling rate estimated by the Kalman filter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
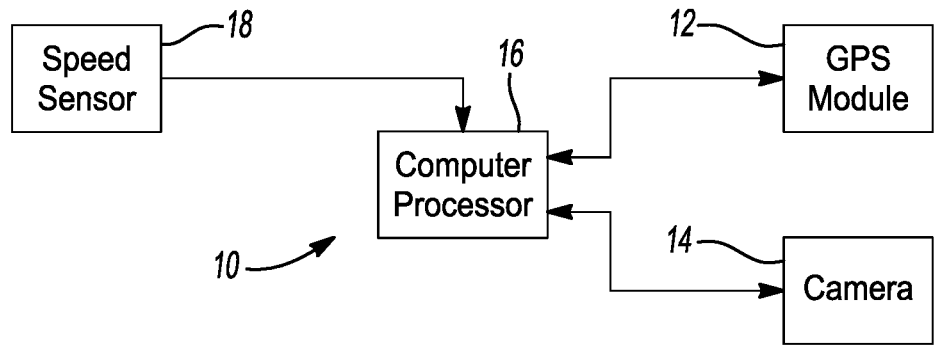
FIG. 1 is block diagram of an example vehicle navigation system.

FIG. 1 depicts components of a vehicle navigation system 10. The vehicle navigation system 10 is comprised of a satellite navigation device 12, a camera 14 and a computer processor 16. In an example embodiment, the satellite navigation device 12 is a GPS receiver although other satellite systems are contemplated. The vehicle navigation system may also receive input from various sensors in the vehicle, for example a speed sensor 18. It is understood that only the relevant components of the system are shown in FIG. 1 but that other sensors and components may be need to implement vehicle navigation. In one example, the vehicle navigation system 10 is integrated into a personal delivery device. The vehicle navigation system 10 is suitable for other types of vehicles including but not limited to bikes, cars, trucks and unmanned aerial vehicles, such as drones.

The vehicle navigation system 10 operates to navigate the vehicle autonomously. Different navigation techniques are readily found in the art. One example approach is based on image processing, road and navigable are identification, template matching classification for navigation control and trajectory selection based on GPS way-points. The vehicle follows a trajectory defined by GPS points avoiding obstacles using a single monocular camera. The images obtained from the camera are classified navigable and non-navigable regions of the environment using neural networks that control the steering and velocity of the vehicle. This approach is further described in the paper "Vision and GPS-based Autonomous Vehicle Navigation Using Templates and Artificial Neural Networks" by Souza et al., SAC '12: Proceedings of the 27th Annual ACM Symposium on Applied Computing March 2012 which is incorporated in its entirety herein by reference. Other suitable navigation techniques also fall within the scope of tis disclosure.

Regarding the energy efficiency of autonomous vehicles, the vehicle navigation procedure is the dominant component of energy consumption. One conventional thought is to reduce the amount of energy by limiting the frequent use of GPS built-in features in autonomous delivery vehicles. Instead, this disclosure uses a sparse set of GPS traces while completing the Last-Mile task. Obtaining a reasonable size of GPS traces, when necessary, can significantly save the battery in the delivery vehicle.

Given a graph G=(V,E), where the edge set E represents the roads and node-set V represents the intersections of the network, potential spots that require one GPS sample to navigate globally are intersections, i.e., nodes of the road networks. For any e∈E, ideally, use the camera built-in feature in an autonomous delivery vehicle to capture images to perform local navigation. There are numerous lane departure algorithms that help the vehicle to proceed among obstacles within the lane or sidewalk. These algorithms fall outside the scope of this disclosure. On the other hand, the constant snapshots of the surroundings, typically every 5-10 seconds on average allow the system to realize if the delivery vehicle is approaching (or at) an intersection, i.e., v∈V. Therefore, GPS and camera are two complementary sensors to recognize the best time for receiving a GPS tracepoint, whenever necessary. It is understood that the navigation system may rely upon other sensors (e.g., ultrasonic sensors) as well. Once the intersection v becomes visible, the delivery vehicle attempts to receive a GPS trace from the satellite. The satellite obtains geographic coordinates (e.g., loc:=(longitude,latitude)) for the vehicle. One can then retrieve the actual location on a map using the geographic coordinates (i.e., GIS) and realize where (globally on G) the vehicle is located.

While the above idea seems plausible, it is often a suboptimal approach to use the camera with a constant temporal rate of capturing images from different lanes. Some sidewalks are lengthier than others and occupied with more entities such that capturing images every 5-10 seconds results in an expensive image processing time. Conversely, some sidewalks are comparatively shorter with less occupying entities hence resulting in missing some GPS traces at some intersections as the camera misses the right time to detect the intersection. Let Θ=(θl, θg) be a parameter for which global and local navigations are set, where θl is the temporal rate of snapshots taken by the camera and θg is the temporal rate of GPS trace receival.

Figure 2:
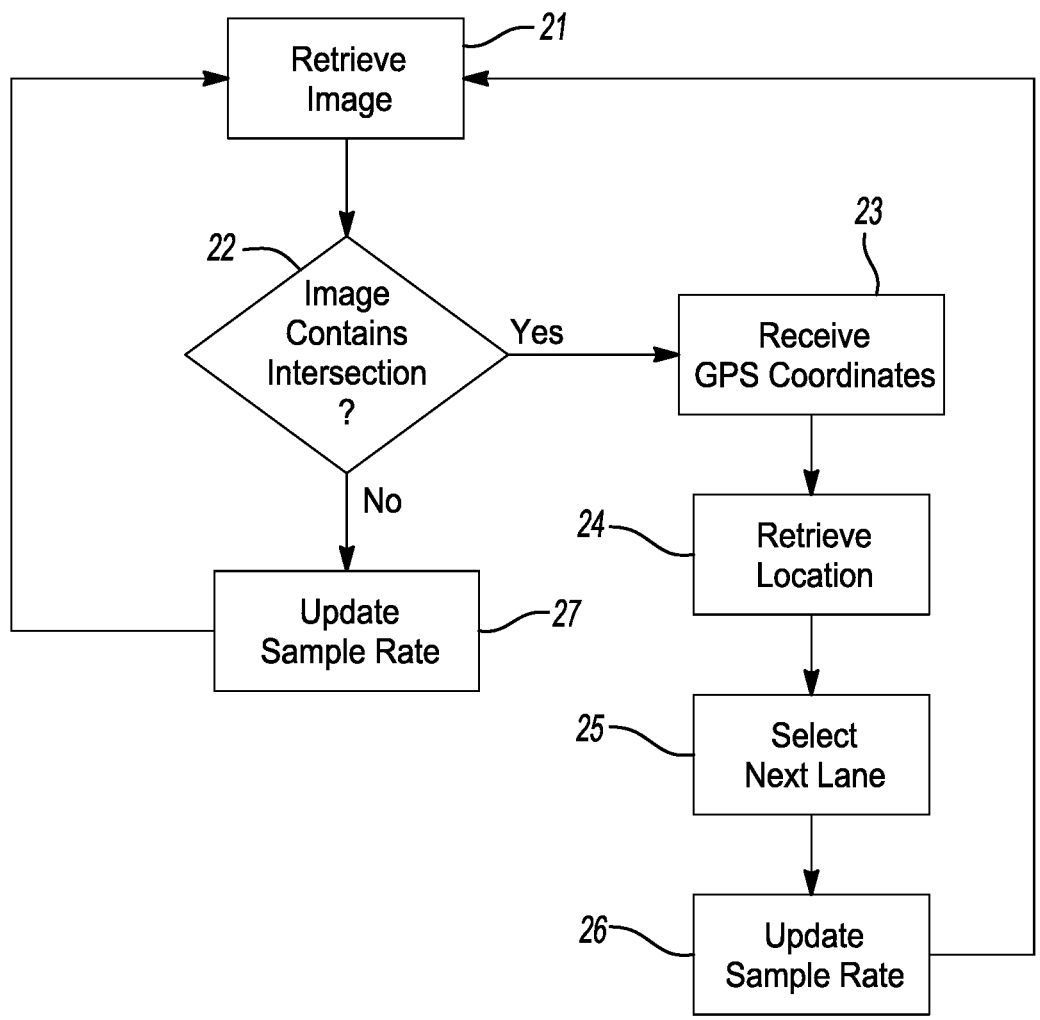
FIG. 2 is a flowchart showing a navigation algorithm according to this disclosure.

FIG. 2 depicts a high-level navigation algorithm according to this disclosure. Images are continual retrieved from the camera as indicated at 21. It is understood that images are retrieved from the camera in accordance with the local sampling rate, θl. For each retrieved image, a determination is made at 22 as to whether an intersection is contained in the image. If the image does not contain an intersection, the local and global sampling rates can be updated at 27 in the manner described below. Another image is retrieved from the camera at 21 and the process is repeated. During such time, the vehicle is navigated using image data.

If the image does contain an intersection, then the vehicle can elect to navigate using geographic coordinates from a satellite navigation device. More specifically, geographic coordinates for the vehicle are received at 23 from the satellite navigation device. It is understood that geographic coordinates are retrieved from the camera in accordance with the global sampling rate, θg. The location of the vehicle is then retrieved at 24 from a map using the geographic coordinates.

In the example embodiment, the path of the vehicle is selected at 25 using a graph, where the nodes of the graph represent intersections and edges of the graph represent paths in the vehicle environment. In an urban environment, path may be understood to be a sidewalk and/or a road. Path, however, may have a more generic meaning such as a path on a factory floor. In any case, the graph represents the available paths that can be traversed in the vehicle's environment. In this way, the vehicle is navigated at least in part using the geographic coordinated from the satellite navigation device.

With continued reference to FIG. 2, the local and global sampling rates are again updated as indicate at 26 and in the manner described below. Upon leaving the intersection, the vehicle can return to navigating based on images captured by the camera as seen at 21. This process is repeated until the vehicle's current location corresponds to the end point of the navigation route. This process is also set forth below.

---

NAVIGATION ALGORITHM

Input: GPS samples, GIS geodatabase map, Network G (V, E), Image
Output: Navigation with minimal set of GPS and image samples
cur_loc ←starting point
WHILE cur_loc is not ending point:
   image ←Camera snapshot
   If image does not contain an intersection v ∈ V:// if currently located within a lane
   image ←Receive image at temporal rate $\theta_l$
   Update($\theta_g$)
   PredictNext($\theta_g$)
   Else: // if currently located at an intersection
      cur_lock← receive a GPS trace (lat, lng) at temporal rate $\theta_g$
      retrieve cur_loc on the GIS map and select the next lane e ∈ E
      Update ($\theta_g$)
      PredictNext ($\theta_g$)
ENDLOOP

---

The challenge is predicting and updating the optimal value for the sampling rates fulfilling the global and local navigations properly. This challenge is tackled by predicting these parameters from a road network G through an adequate number of trips taken across the network. Hypothetically, assume that the network's traffic flow and traffic density are learned and hence given instantly. One can aim to predict Θ instantly as a new lane (edge) is encountered in the network so that the autonomous vehicle adjusts its temporal data retrieval rate based on the new observation. In this regard, a Kalman Filter is used as an iterative linear predictive filter that copes with uncertainty in measurement and process and corrects its prediction. It predicts Θ from the traffic flow induced by pedestrians, bikes, or cars and geographic features of the surroundings, such as the length of the lane.

Figure 3:
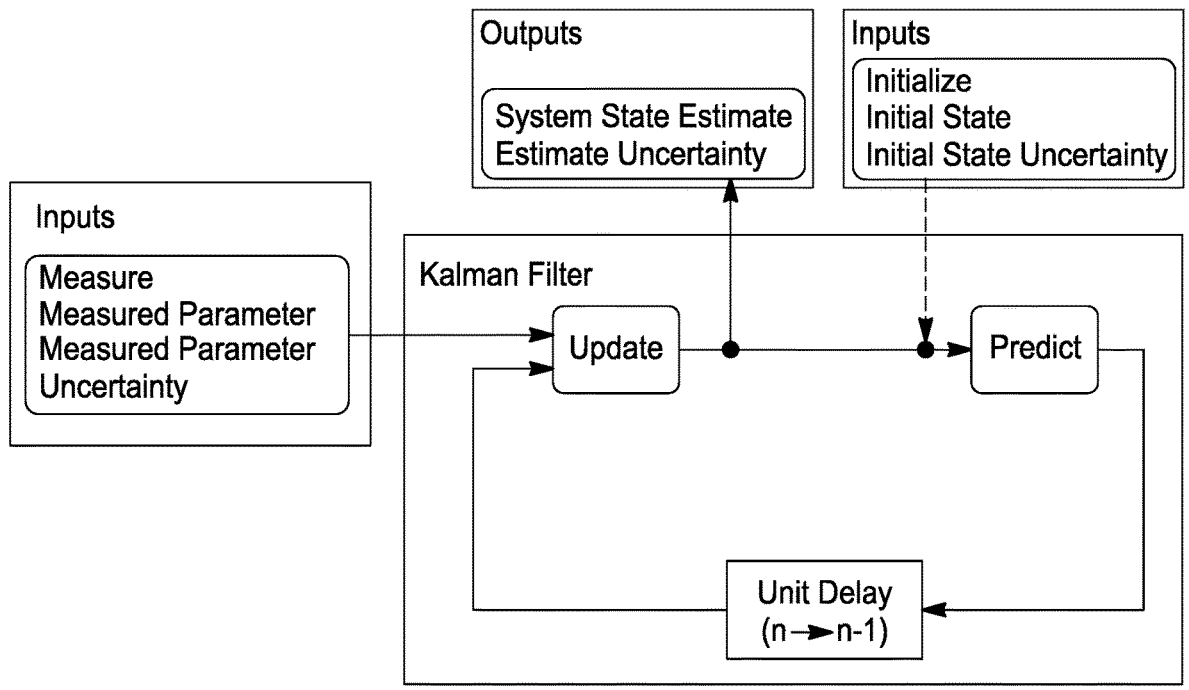
FIG. 3 is a diagram of a Kalman filter.

FIG. 3 illustrates an example Kalman filter. The Kalman filter is comprised of two main components: (1) prediction and (2) correction (update). The input to the filter is a sequence of observations (measurements) Z=(z1, z2, . . . , zk) coming along discrete time points t=(t1, t2, . . . , tn). There are five equations that allow us to update and predict the system state properly. These equations are described below to better understand the filtering process.

State Extrapolation Equation:

$$\hat{x}_{n+1,n} = F\hat{x}_{n,n} + Gu_n + w_n$$

$\hat{x}_{n+1,n}$ is a predicted system state vector at time step n+1
$\hat{x}_{n,n}$ is an estimated system state vector at time step n
$U_n$ is a control or input variable—a measurable (deterministic) input to the system
$w_n$ is a process noise or disturbance—an unmeasurable input that affects the state
F is a state transition matrix
G is a control matrix or input transition matrix (mapping control to state variables)

Covariance Extrapolation Equation $$P_{n+1,n} = FP_{n,n}F^T + Q$$

$P_{n,n}$ is the uncertainty of an estimate—covariance matrix of the current state
$P_{n+1,n}$ is the uncertainty of a prediction—covariance matrix for the next state
F is the state transition matrix
Q is the process noise matrix Measurement Equation $$z_n = Hx_n + v_n$$

$z_n$ is a measurement vector
$x_n$ is a true system state (hidden state)
$v_n$ is a random noise vector
H is an observation matrix State Update Equation $$\hat{x}_{n,n} = \hat{x}_{n,n-1} + K_n(z_n - H\hat{x}_{n,n-1})$$

$\hat{x}_{n,n}$ is an estimated system vector at time step n
$\hat{x}_{n,n-1}$ is a predicted system state vector at time step n−1
$K_n$ is a Kalman Gain
$z_n$ is a measurement
H is an observation matrix Where the Kalman Gain is:

$$K_n = P_{n,n}H^T(HP_{n,n-1}H^T + R_n)^{-1}$$

$R_n$ is the Measurement Uncertainty (measurement noise covariance matrix)

Covariance Update Equation $$P_{n,n} = (I - K_n H)P_{n,n-1}$$

$P_{n,n}$ is the estimate uncertainty (covariance) matrix of the current state
$P_{n,n-1}$ is the prior estimate uncertainty (covariance) matrix of the current state (predicted at the previous state)
$K_n$ is the Kalman Gain
H is the observation matrix
I is an Identity Matrix (the n×n square matrix with ones on the main diagonal and zeros elsewhere)

Next, the Kalman filter is adapted to determine the sampling rates for the navigation algorithm. In an example embodiment, the state vector that estimates the temporal rate of θl and θg is as follows:

$$\hat{x}_n = \begin{bmatrix} \hat{\theta}_{l_n,n} \\ \hat{\theta}_{g_n,n} \end{bmatrix}$$

The two parameters above are related to the network G and the geometry of the surroundings measured by the vehicle through the sensors.

Suppose that q is the traffic flow induced by the commuting entities (vehicles, pedestrians, bikes, etc.) within the lane and/or the sidewalk. Then one has:

$$q = \frac{n}{t}$$

where n is the number of commuting entities passing some designated point during time t. In one example, the number of commuting entities can be determined by a loop detector implemented underneath the road surface. Let k be the traffic density per unit distance in the lane, m be the number of entities occupying the unit length of the lane at some specified time and L be the length of the lane. The traffic density is:

$$k = \frac{m}{L}$$

Now, given the space-mean speed u of the entities, one has q=uk. By taking θl=t:

$$\theta_l = \frac{n}{m} \times \frac{L}{u}$$

Note that Lu indicates the time that the vehicle entirely traverses the entire lane. This is equivalent to θg and therefore:

$$\theta_l = \frac{n}{m}\theta_g + \theta_{l_o}$$

Also, note that:

$$\theta_g = \frac{L}{u} + \theta_{g_o}.$$

In the example embodiment, the state transition matrix is $$F = \begin{bmatrix} 1 & \frac{n}{m} \\ 0 & 1 \end{bmatrix}$$

and the control matrix is $$G = \begin{bmatrix} 0 \\ L \end{bmatrix}$$

Thus, the state extrapolation equation is $$\hat{x}_{n+1,n} = F\hat{x}_{n,n} + Gu_n + w_n \quad (1)$$

$$\begin{bmatrix} \hat{\theta}_{l_n+1,n} \\ \hat{\theta}_{g_n+1,n} \end{bmatrix} = \begin{bmatrix} 1 & \frac{n}{m} \\ 0 & 1 \end{bmatrix} \begin{bmatrix} \hat{\theta}_{l_n,n} \\ \hat{\theta}_{g_n,n} \end{bmatrix} + \begin{bmatrix} 0 \\ L \end{bmatrix}\begin{bmatrix} \frac{1}{u} \end{bmatrix} +$$

$$W_n \cdot \xrightarrow{W_n \sim 0} \begin{bmatrix} \hat{\theta}_{l_n+1,n} \\ \hat{\theta}_{g_n+1,n} \end{bmatrix} = \begin{bmatrix} \hat{\theta}_{l_n,n} + \left(\frac{n}{m}\right)\hat{\theta}_{g_n,n} \\ \hat{\theta}_{g_n,n} + \frac{L}{u} \end{bmatrix}$$

Assume that $u_n$ is a control output, meaning that there is a sensor connected to the vehicle that estimates the inverse speed 1/u or its pace. For simplicity, one can assume the unmeasurable input noise is zero, i.e, $w_n$=0. In some scenarios, it is also assumed that: $u_n$=0. In some instances, one also assumes no control input, meaning that no sensor is connected to the vehicle's control.

Covariance Extrapolation Equation $$P_{n+1,n} = FP_{n,n}F^T + Q$$

$$\begin{bmatrix} \sigma^2_{l_{n+1,n}} & \sigma_{l_{n+1,n}}\sigma_{g_{n+1,n}} \\ \sigma_{g_{n+1,n}}\sigma_{l_{n+1,n}} & \sigma^2_{g_{n+1,n}} \end{bmatrix} =$$

$$\begin{bmatrix} 1 & \frac{n}{m} \\ 0 & 1 \end{bmatrix} \begin{bmatrix} \sigma^2_{l_{n,n}} & \sigma_{l_{n,n}}\sigma_{g_{n,n}} \\ \sigma_{g_{n,n}}\sigma_{l_{n,n}} & \sigma^2_{g_{n,n}} \end{bmatrix} \begin{bmatrix} 1 & 0 \\ \frac{n}{m} & 1 \end{bmatrix} + \begin{bmatrix} V(\theta_l) & COV(\theta_l, \theta_g) \\ COV(\theta_g, \theta_l) & V(\theta_g) \end{bmatrix}$$

See Appendix below for constructing the Process Noise Matrix Q:

$$Q = \begin{bmatrix} \frac{n^2}{m^2} & \frac{n}{m} \\ \frac{n}{m} & 1 \end{bmatrix} \cdot \sigma^2_{\theta_g}$$

We plug Q and F into the formula below:

$$P_{n+1,n} = FP_{n,n}F^T + Q$$

And we obtain:

$$P_{n+1,n} = \begin{bmatrix} \sigma^2_{l_{n,n}} = +2\left(\frac{n}{m}\right)\sigma_{g_{n,n}}\sigma_{l_{n,n}} + \sigma_{l_{n,n}}\sigma_{g_{n,n}} + & 2\left(\frac{n}{m}\right)^2\sigma^2_{g_{n,n}} & 2\left(\frac{n}{m}\right)\sigma^2_{g_{n,n}} \\ \sigma_{g_{n,n}}\sigma_{l_{n,n}} + 2\left(\frac{n}{m}\right)\sigma^2_{g_{n,n}} & 2\sigma^2_{g_{n,n}} \end{bmatrix} \quad (2)$$

See Appendix below for further details.

Measurement Equation $$z_n = Hx_n + v_n$$

The true System State is:

$$x_n = \begin{bmatrix} \theta_l \\ \theta_g \end{bmatrix}$$

However the vehicle only measures the two $\theta_l$ and $\theta_g$ parameters. Hence, take:

$$H = \begin{bmatrix} 1 & 0 \\ 0 & 1 \end{bmatrix}$$

Thus:

$$z_n = \begin{bmatrix} 1 & 0 \\ 0 & 1 \end{bmatrix} \cdot \begin{bmatrix} \theta_l \\ \theta_g \end{bmatrix} = \begin{bmatrix} \theta_l \\ \theta_g \end{bmatrix} \quad (3)$$

Assume that the random Noise Vector $v_n = 0$

State Update Equation $$\hat{x}_{n,n} = \hat{x}_{n,n-1} + K_n(z_n - H\hat{x}_{n,n-1})$$

$$\begin{bmatrix} \hat{\theta}_{ln,n} \\ \hat{\theta}_{gn,n} \end{bmatrix} = \begin{bmatrix} \hat{\theta}_{ln,n-1} \\ \hat{\theta}_{gn,n-1} \end{bmatrix} + K_n\left(\begin{bmatrix} \theta_l \\ \theta_g \end{bmatrix} - \begin{bmatrix} 1 & 0 \\ 0 & 1 \end{bmatrix}\begin{bmatrix} \hat{\theta}_{ln,n-1} \\ \hat{\theta}_{gn,n-1} \end{bmatrix}\right)$$

-continued $$\overset{(1),(3)}{\Longrightarrow} \begin{bmatrix} \hat{\theta}_{ln,n-1} \\ \hat{\theta}_{gn,n-1} \end{bmatrix} + K_n\left(\begin{bmatrix} \theta_l \\ \theta_g \end{bmatrix} - \begin{bmatrix} \hat{\theta}_{ln,n-1} + \left(\frac{n}{m}\right)\hat{\theta}_{gn,n-1} \\ \hat{\theta}_{gn,n-1} + \frac{L}{u} \end{bmatrix}\right)$$

$$\begin{bmatrix} \hat{\theta}_{ln,n-1} \\ \hat{\theta}_{gn,n-1} \end{bmatrix} + K_n\left(\begin{bmatrix} \theta_l - \hat{\theta}_{ln,n-1} + \left(\frac{n}{m}\right)\hat{\theta}_{gn,n-1} \\ \theta_g - \hat{\theta}_{gn-1,n-1} + \frac{L}{u} \end{bmatrix}\right)$$

Now plug the Kalman Gain into the formula above. See Appendix for obtaining Kalman Gain $K_n$ and $\hat{x}_{n,n}$. Finally, set out to the Covariance Update Equation.

Covariance Update Equation $$P_{n,n} = (I - K_n H)P_{n,n-1}$$

$P_{n,n}$ can be obtained by plugging (2) and (5) (obtained in Appendix) into the formula above.

Due to the space-consuming expansion of matrix multiplication we avoid simplifying this formula.

Figure 4:
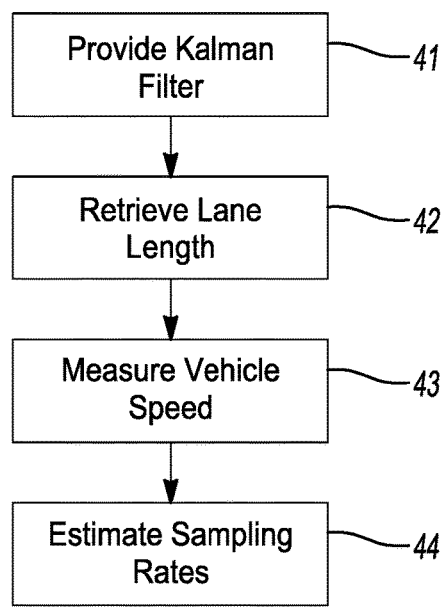
FIG. 4 is a diagram depicting a method of determining the sampling rates for a camera and/or satellite navigation device deployed in an autonomous vehicle.

Given the adapted Kalman filter described above, a computer-implemented method for determining the local and global sampling rates is described in relation to FIG. 4. The adapted Kalman filter is used to predict a local sampling rate for the camera and a global sampling rate for the receiver in the global navigation satellite system. In the example embodiment, the control matrix of the Kalman filter is defined in terms of length of a lane being traversed by the autonomous vehicle, the state transition matrix of the Kalman filter is defined in terms the number of entities occupying a unit length of the lane, and the measurable input to the Kalman filter is speed of the autonomous vehicle.

First, the length of the lane being traversed by the autonomous vehicle is retrieved at 42 from a graph, where nodes of the graph represent intersections in a road network and edges of the graph represent paths in the road network. While reference is made to a graph representing a network of roads, it is understood that the graph can more generically represent available paths that can be traversed in the vehicle's environment.

Next, the speed of the autonomous vehicle as it traverses the lane is measured at 43, for example by a speed sensor. Using vehicle speed as an input, the local sampling rate and the global sampling rate are estimated at 44 with the adapted Kalman filter described above. This method can be used to periodically update the sampling rates in the context of a navigation algorithm, for example as seen at 26 and 27 of FIG. 2. The updated sampling rate may in turn be used capture images with a camera and/or receive geographic coordinates by a satellite navigation device.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

Covariance Extrapolation Equation $$P_{n+1,n} = FP_{n,n}F^T + Q$$

$$\begin{bmatrix} \sigma^2_{l_{n+1,n}} & \sigma_{l_{n+1,n}}\sigma_{g_{n+1,n}} \\ \sigma_{g_{n+1,n}}\sigma_{l_{n+1,n}} & \sigma^2_{g_{n+1,n}} \end{bmatrix} = \begin{bmatrix} 1 & \frac{n}{m} \\ 0 & 1 \end{bmatrix} \begin{bmatrix} \sigma^2_{l_{n,n}} & \sigma_{l_{n,n}}\sigma_{g_{n,n}} \\ \sigma_{g_{n,n}}\sigma_{l_{n,n}} & \sigma^2_{g_{n,n}} \end{bmatrix}$$

$$\begin{bmatrix} 1 & 0 \\ \frac{n}{m} & 1 \end{bmatrix} + \begin{bmatrix} V(\theta_l) & COV(\theta_l, \theta_g) \\ COV(\theta_g, \theta_l) & V(\theta_g) \end{bmatrix}$$

For constructing the Process Noise Matrix Q we do the following:

$$Q = \begin{bmatrix} V(\theta_l) & COV(\theta_l, \theta_g) \\ COV(\theta_g, \theta_l) & V(\theta_g) \end{bmatrix}$$

Where V denotes the variance and COV denotes the covariance between the two variables. We have:

$$V(\theta_l) = \sigma^2_{\theta_l} =$$

$$E(\theta_L^2) - \mu^2_{\theta_l} = E\left(\left(\frac{n}{m}\right)^2 \theta_g^2\right) - \left(\mu_{\theta_g} \cdot \frac{n}{m}\right)^2 = \left(\frac{n^2}{m^2}\right)(E(\theta_g^2) - \mu^2_{\theta_g}) = \left(\frac{n^2}{m^2}\right) \cdot \sigma^2_{\theta_g}$$

$$V(\theta_g) = \sigma^2_{\theta_g}$$

$$COV(\theta_l, \theta_g) = COV(\theta_g, \theta_l) = E(\theta_l, \theta_g) - \mu_{\theta_l} \cdot \mu_{\theta_g} =$$

$$E\left(\frac{n}{m} \cdot \theta_g \theta_g\right) - \left(\frac{n}{m}\right)\mu_{\theta_l} \cdot \mu_{\theta_g} = \left(\frac{n}{m}\right)(E(\theta_g^2) - \mu^2_{\theta_g}) = \left(\frac{n}{m}\right)\mu^2_{\theta_g}$$

So Q would be:

$$Q = \begin{bmatrix} \frac{n^2}{m^2} & \frac{n}{m} \\ \frac{n}{m} & 1 \end{bmatrix} \cdot \sigma^2_{\theta_g}$$

Therefore:

$$P_{n+1,n} = FP_{n,n}F^T + Q$$

$$\begin{bmatrix} \sigma^2_{l_{n+1,n}} & \sigma_{l_{n+1,n}}\sigma_{g_{n+1,n}} \\ \sigma_{g_{n+1,n}}\sigma_{l_{n+1,n}} & \sigma^2_{g_{n+1,n}} \end{bmatrix} =$$

$$\begin{bmatrix} 1 & \frac{n}{m} \\ 0 & 1 \end{bmatrix} \begin{bmatrix} \sigma^2_{l_{n,n}} & \sigma_{l_{n,n}}\sigma_{g_{n,n}} \\ \sigma_{g_{n,n}}\sigma_{l_{n,n}} & \sigma^2_{g_{n,n}} \end{bmatrix} \begin{bmatrix} 1 & 0 \\ \frac{n}{m} & 1 \end{bmatrix} + Q$$

-continued $$\Rightarrow \begin{bmatrix} \sigma_{l_{n,n}}^2 + \frac{n}{m}\sigma_{g_{n,n}}\sigma_{l_{n,n}} & \sigma_{l_{n,n}}\sigma_{g_{n,n}} + \left(\frac{n}{m}\right)\sigma_{g_{n,n}}^2 \\ \sigma_{g_{n,n}}\sigma_{l_{n,n}} & \sigma_{g_{n,n}}^2 \end{bmatrix} \begin{bmatrix} 1 & 0 \\ \frac{n}{m} & 1 \end{bmatrix} + \begin{bmatrix} \frac{n^2}{m^2} & \frac{n}{m} \\ \frac{n}{m} & 1 \end{bmatrix} \cdot \sigma_{\theta_g}^2$$

$$\Rightarrow \begin{bmatrix} \sigma_{l_{n,n}}^2 = +2\left(\frac{n}{m}\right)\sigma_{g_{n,n}}\sigma_{l_{n,n}} + 2\left(\frac{n}{m}\right)^2\sigma_{g_{n,n}}^2 & \sigma_{l_{n,n}}\sigma_{g_{n,n}} + 2\left(\frac{n}{m}\right)\sigma_{g_{n,n}}^2 \\ \sigma_{g_{n,n}}\sigma_{l_{n,n}} + 2\left(\frac{n}{m}\right)\sigma_{g_{n,n}}^2 & 2\sigma_{g_{n,n}}^2 \end{bmatrix} \quad (2)$$

Kalman Gain $$K_n = P_{n,n}H^T\left(HP_{n,n-1}H^T + R_n\right)^{-1}$$

$$K_n = \begin{bmatrix} \sigma_{l_{n,n}}^2 & \sigma_{l_{n,n}}\sigma_{g_{n,n}} \\ \sigma_{g_{n,n}}\sigma_{l_{n,n}} & \sigma_{g_{n,n}}^2 \end{bmatrix} \begin{bmatrix} 1 & 0 \\ 0 & 1 \end{bmatrix}$$

$$\left(\begin{bmatrix} 1 & 0 \\ 0 & 1 \end{bmatrix}\begin{bmatrix} \sigma_{l_{n,n-1}}^2 & \sigma_{l_{n,n-1}}\sigma_{g_{n,n-1}} \\ \sigma_{g_{n,n-1}}\sigma_{l_{n,n-1}} & \sigma_{g_{n,n-1}}^2 \end{bmatrix}\begin{bmatrix} 1 & 0 \\ 0 & 1 \end{bmatrix} + R_n\right)^{-1}$$

$$\Rightarrow K_n = \begin{bmatrix} \sigma_{l_{n,n}}^2 & \sigma_{l_{n,n}}\sigma_{g_{n,n}} \\ \sigma_{g_{n,n}}\sigma_{l_{n,n}} & \sigma_{g_{n,n}}^2 \end{bmatrix}\left(\begin{bmatrix} \sigma_{l_{n,n-1}}^2 & \sigma_{l_{n,n-1}}\sigma_{g_{n,n-1}} \\ \sigma_{g_{n,n-1}}\sigma_{l_{n,n-1}} & \sigma_{g_{n,n-1}}^2 \end{bmatrix} + R_n\right)^{-1}$$

Where $R_n$ is a measurement noise captured by the device. The noise can be a white Gaussian noise:

$$R_n = \begin{bmatrix} r_l & 0 \\ 0 & r_g \end{bmatrix}$$

Where $r_l \sim \aleph(0, V(\theta_l))$ and $r_g \sim \aleph(0, V(\theta_g))$. Now we have:

$$K_n = \begin{bmatrix} \sigma_{l_{n,n}}^2 & \sigma_{l_{n,n}}\sigma_{g_{n,n}} \\ \sigma_{g_{n,n}}\sigma_{l_{n,n}} & \sigma_{g_{n,n}}^2 \end{bmatrix}$$

$$\left(\begin{bmatrix} \sigma_{l_{n,n-1}}^2 & \sigma_{l_{n,n-1}}\sigma_{g_{n,n-1}} \\ \sigma_{g_{n,n-1}}\sigma_{l_{n,n-1}} & \sigma_{g_{n,n-1}}^2 \end{bmatrix} + \begin{bmatrix} r_l & 0 \\ 0 & r_g \end{bmatrix}\right)^{-1}$$

$$\Rightarrow \begin{bmatrix} \sigma_{l_{n,n}}^2 & \sigma_{l_{n,n}}\sigma_{g_{n,n}} \\ \sigma_{g_{n,n}}\sigma_{l_{n,n}} & \sigma_{g_{n,n}}^2 \end{bmatrix}\left(\begin{bmatrix} \sigma_{l_{n,n-1}}^2 + r_l & \sigma_{l_{n,n-1}}\sigma_{g_{n,n-1}} \\ \sigma_{g_{n,n-1}}\sigma_{l_{n,n-1}} & \sigma_{g_{n,n-1}}^2 + r_g \end{bmatrix}\right)^{-1}$$

$$\xRightarrow{inverse} \begin{bmatrix} \sigma_{l_{n,n}}^2 & \sigma_{l_{n,n}}\sigma_{g_{n,n}} \\ \sigma_{g_{n,n}}\sigma_{l_{n,n}} & \sigma_{g_{n,n}}^2 \end{bmatrix}\left(\frac{1}{(\sigma_{l_{n,n-1}}^2+r_l)(\sigma_{g_{n,n-1}}^2+r_g) - \sigma_{g_{n,n-1}}^2\sigma_{l_{n,n-1}}^2}\right)$$

$$\begin{bmatrix} \sigma_{g_{n,n-1}}^2 + r_g & -\sigma_{l_{n,n-1}}\sigma_{g_{n,n-1}} \\ -\sigma_{g_{n,n-1}}\sigma_{l_{n,n-1}} & \sigma_{g_{n,n-1}}^2 + r_l \end{bmatrix}$$

$$\Rightarrow \begin{bmatrix} \sigma_{l_{n,n}}^2 & \sigma_{l_{n,n}}\sigma_{g_{n,n}} \\ \sigma_{g_{n,n}}\sigma_{l_{n,n}} & \sigma_{g_{n,n}}^2 \end{bmatrix}$$

$$\left(\frac{1}{(r_l\sigma_{g_{n,n-1}}^2 + r_g\sigma_{l_{n,n-1}}^2 + r_l r_g)}\right)\begin{bmatrix} \sigma_{g_{n,n-1}}^2 + r_g - \sigma_{l_{n,n-1}} & \sigma_{g_{n,n-1}} \\ \sigma_{g_{n,n-1}}\sigma_{l_{n,n-1}} & \sigma_{g_{n,n-1}}^2 + r_l \end{bmatrix} \quad (5)$$

$$\Rightarrow \left(\frac{1}{(r_l\sigma_{g_{n,n-1}}^2 + r_g\sigma_{l_{n,n-1}}^2 + r_l r_g)}\right)$$

$$\begin{bmatrix} \sigma_{l_{n,n}}^2(\sigma_{g_{n,n-1}}^2+r_g) - & -\sigma_{l_{n,n}}^2\sigma_{l_{n,n-1}}\sigma_{g_{n,n-1}} + \\ \sigma_{l_{n,n}}\sigma_{g_{n,n}}\sigma_{g_{n,n-1}}\sigma_{l_{n,n-1}} & \sigma_{l_{n,n}}\sigma_{g_{n,n}}(\sigma_{l_{n,n-1}}^2+r_l) \\ -\sigma_{g_{n,n}}^2\sigma_{l_{n,n-1}}\sigma_{g_{n,n-1}} + & \sigma_{g_{n,n}}^2(\sigma_{l_{n,n-1}}^2+r_l) - \\ \sigma_{l_{n,n}}\sigma_{g_{n,n}}(\sigma_{g_{n,n-1}}^2+r_g) & \sigma_{l_{n,n}}\sigma_{g_{n,n}}\sigma_{g_{n,n-1}}\sigma_{l_{n,n-1}} \end{bmatrix}$$

Therefore:

$$\hat{x}_{n,n} = \begin{bmatrix} \hat{\theta}_{l_{n+1,n}} \\ \hat{\theta}_{g_{n+1,n}} \end{bmatrix} + K_n \begin{bmatrix} \theta_l - \hat{\theta}_{l_{n-1,n-1}} + \left(\frac{n}{m}\right)\hat{\theta}_{g_{n-1,n-1}} \\ \theta_g - \hat{\theta}_{g_{n-1,n-1}} + \frac{L}{u} \end{bmatrix}$$

$$\hat{x}_{n,n} = \begin{bmatrix} \hat{\theta}_{l_{n,n-1}} \\ \hat{\theta}_{g_{n-1}} \end{bmatrix} + \begin{bmatrix} \dfrac{\sigma_{l_{n,n}}^2(\sigma_{g_{n,n-1}}^2+r_g) - \sigma_{l_{n,n}}\sigma_{g_{n,n}}\sigma_{g_{n,n-1}}\sigma_{l_{n,n-1}}}{r_l\sigma_{g_{n,n-1}}^2 + r_g\sigma_{l_{n,n-1}}^2 + r_l r_g} & \dfrac{-\sigma_{l_{n,n}}^2\sigma_{l_{n,n-1}}\sigma_{g_{n,n-1}} + \sigma_{l_{n,n}}\sigma_{g_{n,n}}(\sigma_{l_{n,n-1}}^2+r_l)}{r_l\sigma_{g_{n,n-1}}^2 + r_g\sigma_{l_{n,n-1}}^2 + r_l r_g} \\ \dfrac{\sigma_{g_{n,n}}^2\sigma_{l_{n,n-1}}\sigma_{g_{n,n-1}} + \sigma_{l_{n,n}}\sigma_{g_{n,n}}(\sigma_{l_{n,n-1}}^2+r_g)}{r_l\sigma_{g_{n,n-1}}^2 + r_g\sigma_{l_{n,n-1}}^2 + r_l r_g} & \dfrac{\sigma_{g_{n,n}}\sigma_{g_{n,n-1}}\sigma_{l_{n,n-1}}}{r_l\sigma_{g_{n,n-1}}^2 + r_g\sigma_{l_{n,n-1}}^2 + r_l r_g} \end{bmatrix}$$

$$\begin{bmatrix} \theta_l - \hat{\theta}_{l_{n-1,n-1}} + \left(\frac{n}{m}\right)\hat{\theta}_{g_{n-1,n-1}} \\ \theta_g - \hat{\theta}_{g_{n-1,n-1}} + \frac{L}{u} \end{bmatrix}$$

What is claimed is:

1. A computer-implemented method for determining sampling rate for at least one of a camera and a receiver of a global navigation satellite system deployed in an autonomous vehicle, comprising:

providing a Kalman filter for predicting a local sampling rate for the camera and a global sampling rate for the receiver in the global navigation satellite system, where control matrix of the Kalman filter is defined in terms of length of a lane being traversed by the autonomous vehicle, state transition matrix of the Kalman filter is defined in terms the number of entities occupying a unit length of the lane, and measurable input to the Kalman filter is speed of the autonomous vehicle;

retrieving, by a computer processor, length of the lane being traversed by the autonomous vehicle from a graph, where nodes of the graph represent intersection in a road network and edges of the graph represent paths in the road network;

measuring, by a sensor, speed of the autonomous vehicle as it traverses the lane; and estimating, by the computer processor, the local sampling rate and the global sampling rate using the measured speed and the Kalman filter; and capturing, by the camera, images in accordance with the local sampling rate estimated by the Kalman filter.

2. The method of claim 1 wherein the state transition matrix is $$F = \begin{bmatrix} 1 & \frac{n}{m} \\ 0 & 1 \end{bmatrix}$$

and the control matrix is $$G = \begin{bmatrix} 0 \\ L \end{bmatrix}$$

where L is the length of the lane being traversed by the autonomous vehicle, m is the number of entities occupying a unit length of the lane and n is current time step.

3. The method of claim 1 further comprises determining the number of entities occupying a unit length of the lane by loop detector sensor.

4. The method of claim 1 further comprises receiving, by the computer processor, a given image from the camera;

determining, by the computer processor, whether the given image contains an intersection;

capturing, by the camera, additional images in accordance with the local sampling rate and in response to the absence of an intersection in the given image; and navigating the autonomous vehicle using the additional images and in response to the presence of an intersection in the given image.

5. The method of claim 4 further comprises navigating the autonomous vehicle using geographic coordinates from the receiver in response to the presence of an intersection in the given image.

6. The method of claim 5 wherein navigating the autonomous vehicle using geographic coordinates from the receiver further comprises receiving geographic coordinates from the receiver in accordance with the global sampling rate estimated by the Kalman filter;

retrieving location of the autonomous vehicle on a map using the geographic coordinates;

selecting next lane to traverse from the graph; and updating estimates of the local sampling rate and the global sampling rate using the Kalman filter.

7. A non-transitory computer-readable medium having computer-executable instructions that, upon execution of the instructions by a processor of a computer, perform to:

retrieve length of the lane being traversed by an autonomous vehicle from a graph, where nodes of the graph represent intersection in a road network and edges of the graph represent paths in the road network;

measure speed of the autonomous vehicle as it traverses the lane;

maintain a Kalman filter for predicting a local sampling rate for a camera deployed in the autonomous vehicle and a global sampling rate for a receiver of a global navigation satellite system deployed in the autonomous vehicle, where control matrix of the Kalman filter is defined in terms of length of a lane being traversed by the autonomous vehicle, state transition matrix of the Kalman filter is defined in terms the number of entities occupying a unit length of the lane, and measurable input to the Kalman filter is speed of the autonomous vehicle;

estimate the local sampling rate and the global sampling rate using the measured speed and the Kalman filter; and capture images using the camera, where the images are captured in accordance with the local sampling rate estimated by the Kalman filter.

8. The non-transitory computer-readable medium of claim 7 wherein the state transition matrix is $$F = \begin{bmatrix} 1 & \frac{n}{m} \\ 0 & 1 \end{bmatrix}$$

and the control matrix is $$G = \begin{bmatrix} 0 \\ L \end{bmatrix}$$

where L is the length of the lane being traversed by the autonomous vehicle, m is the number of entities occupying a unit length of the lane and n is current time step.

9. The non-transitory computer-readable medium of claim 7 further performs determining the number of entities occupying a unit length of the lane by loop detector sensor.

10. The non-transitory computer-readable medium of claim 7 further performs receive a given image from the camera;

determine whether the given image contains an intersection;

capture additional images in accordance with the local sampling rate and in response to the absence of an intersection in the given image; and navigate the autonomous vehicle using the additional images and in response to the presence of an intersection in the given image.

11. The non-transitory computer-readable medium of claim 10 further performs to navigate the autonomous vehicle using geographic coordinates from the receiver in response to the presence of an intersection in the given image.

12. The non-transitory computer-readable medium of claim 11 wherein navigating the autonomous vehicle using geographic coordinates from the receiver includes receiving geographic coordinates from the receiver in accordance with the global sampling rate estimated by the Kalman filter; retrieving location of the autonomous vehicle on a map using the geographic coordinates; selecting next lane to traverse from the graph; and updating estimates of the local sampling rate and the global sampling rate using the Kalman filter.

* * * * *